3,605,276
FLUIDIZED BED DRYER
Joseph T. Enders, Berkeley, Ill., assignor to
Struthers Wells Corporation
Filed July 25, 1969, Ser. No. 844,940
Claims priority, application Great Britain, July 29, 1968,
35,995/68
Int. Cl. F26b 17/10
U.S. Cl. 34—57A          2 Claims

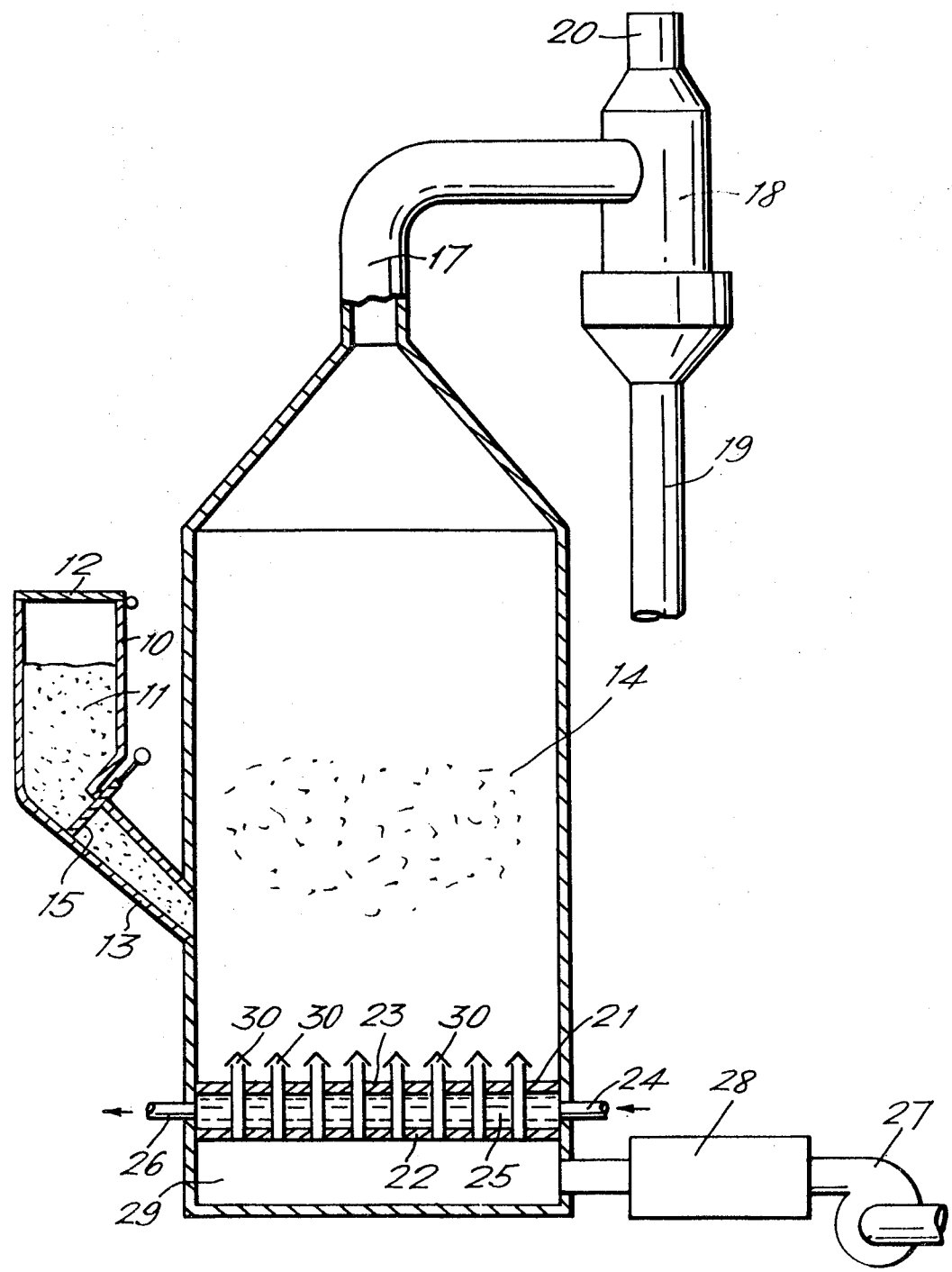

ABSTRACT OF THE DISCLOSURE

In a fluidized bed dryer hot air is introduced into the bottom of the dryer through nozzles fixed in a cooled distributor plate.

BACKGROUND OF THE INVENTION

When certain materials are being dried in a fluidized bed dryer, such as ammonium sulphate, other chemicals, and many polymers, some particles may contact the hot distributor plate and the nozzles fixed therein to bake, stick thereon, and aggregate to defluidize the bed.

SUMMARY OF THE INVENTION

A hollow distributor plate is water cooled and has nozzles transfixing it to pass a hot drying gas therethrough. The high heat conductivity of the metal nozzles allows them to remain relatively cool while passing a hot drying gas through the cooled distributor plate to prevent the aggregation of material on them. The high velocity of the drying gas through the nozzles and its very short residence time in them prevents any appreciable cooling of the heated drying gas.

BRIEF DESCRIPTION OF THE DRAWING

The figure is a vertical section through a fluidized bed dryer according to this invention.

DESCRIPTION OF THE PREFERRED EMBODIMENT

A fluidized bed dryer has a hopper 10 which is charged with material 11 to be dried. Hopper 10 is loaded through an air tight lid 12. A chute 13 conducts material 11 to the chamber 14 of the fluidized bed dryer when the gate 14 is opened.

Chamber 14 has a conical top 16 from which a duct 17 leads to a conventional separator 18 from which dry product falls downward in duct 19 and from which fluidizing gas with picked up moisture leaves through duct 20.

The fluidized bed drier has a hollow distributor plate 21 formed by the spaced apart partition plates 22 and 23. Cooling water 25 from pipe 24 flows between plates 22 and 23 and is withdrawn through pipe 26. A blower 27 forces air or any other drying gas through heater 28 into compartment 29 below the distributor plate 21.

Nozzles 30 pass the hot gas from compartment 29 through distributor plate 21 to fluidize material to be dried in chamber 14.

The water cooled nozzles 30 and the distributor plate 21 cannot bake material thereon and so defluidize material in chamber 14. In addition, cleaning and maintenance of the apparatus is greatly reduced. The residence time of hot gas in chamber 29 and its time in passage through nozzles 30 is so short that the hot gas is not appreciably cooled. This results in the efficient operation of the fluid bed dryer of this invention.

This invention allows the use of a higher temperature drying gas so that a smaller volume of gas may accomplish a given result. This allows the use of a smaller chamber 14 for a given dried chemical production.

What is claimed is:

1. In a fluidized bed dryer having a drying chamber, means introducing a hot fluidizing gas into the bottom of said chamber, means introducing into said chamber a material to be fluidized and dried, means conducting the fluidizing gas from the upper portion of said chamber, and means separating dried material from said fluidizing gas: the improvement comprising, in combination, a distributor plate in the bottom of said chamber formed from two spaced apart partition plates, nozzles each of which extends through both of said partition plates passing the hot fluidizing gas therethrough, said partition plates forming a fluid tight compartment, said means introducing a fluidizing gas into said chamber introducing said gas below said distributor plate to flow through said nozzles, means introducing a coolant between said partition plates cooling said partition plates and said nozzles, and means withdrawing said coolant from between said partition plates and from said fluidized bed dryer.

2. The combination according to claim 1 wherein said coolant is water.

References Cited

UNITED STATES PATENTS

| | | | |
|---|---|---|---|
| 2,719,184 | 9/1955 | Kosbahn et al. | 23—284X |
| 2,789,034 | 4/1957 | Swaine et al. | 34—57AUX |
| 3,016,624 | 1/1962 | Bliss | 34—57A |
| 3,040,439 | 6/1962 | Frost | 34—57A |
| 3,147,084 | 9/1964 | Franzen et al. | 23—284X |
| 3,215,508 | 11/1965 | Piester | 34—57AX |
| 3,277,582 | 10/1966 | Munro et al. | 34—57A |

FREDERICK L. MATTESON, Primary Examiner

R. A. DUA, Assistant Examiner

U.S. Cl. X.R.

23—288.35